(12) United States Patent
Rawlings et al.

(10) Patent No.: US 8,413,928 B2
(45) Date of Patent: Apr. 9, 2013

(54) STRUCTURALLY DESIGNED AERODYNAMIC RIBLETS

(75) Inventors: Diane C. Rawlings, Bellevue, WA (US); James D. McLean, Jr., Seattle, WA (US); Mary J. Mathews, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 535 days.

(21) Appl. No.: 12/566,907

(22) Filed: Sep. 25, 2009

(65) Prior Publication Data

US 2011/0073710 A1    Mar. 31, 2011

(51) Int. Cl.
*B64C 1/38* (2006.01)
*B64C 3/36* (2006.01)

(52) U.S. Cl. .................................. 244/130; 244/198

(58) Field of Classification Search ............. 244/130, 244/200, 200.1, 1 N, 134 E, 199.4, 198
See application file for complete search history.

(56) References Cited

U.S. PATENT DOCUMENTS

| | | | | |
|---|---|---|---|---|
| 5,069,403 A | * | 12/1991 | Marentic et al. | 244/130 |
| 6,177,189 B1 | * | 1/2001 | Rawlings et al. | 428/343 |
| 2008/0290214 A1 | * | 11/2008 | Guzman et al. | 244/119 |
| 2010/0108813 A1 | * | 5/2010 | Lang | 244/130 |

FOREIGN PATENT DOCUMENTS

| | | |
|---|---|---|
| WO | 2007036349 A1 | 4/2007 |
| WO | 2009000703 A1 | 12/2008 |

OTHER PUBLICATIONS

Walsh, M J et al, Optimazation and application of riblets for turbulent drag.

* cited by examiner

*Primary Examiner* — Timothy D Collins
*Assistant Examiner* — Brian M O'Hara
(74) *Attorney, Agent, or Firm* — Felix L. Fischer

(57) ABSTRACT

An array of aerodynamic riblets is formed with a surface layer for adhering to an aerodynamic surface and a plurality of riblet tips having a parabolic cross section extending from the surface layer.

10 Claims, 17 Drawing Sheets

STRUCTURALLY DESIGNED AERODYNAMIC RIBLETS

REFERENCE TO RELATED APPLICATIONS

This application is copending with U.S. patent application Ser. No. 12/361,882 entitled Shape Memory Riblets by inventors Diane C. Rawlings and Terry L. Schneider and U.S. patent application Ser. No. 12/361,918 entitled Amorphous Metal Riblets by inventors Diane C. Rawlings and Stephen Christensen both filed on Jan. 29, 2009 the disclosures of which are incorporated herein by reference. This application is also copending with U.S. patent application Ser. No. 12/566,927 filed substantially concurrently herewith entitled Elastomeric Riblets by inventors Diane C. Rawlings and Alan Burg the disclosure of which is incorporated herein by reference.

BACKGROUND INFORMATION

1. Field

Embodiments of the disclosure relate generally to the field of tailoring of surface geometries for aerodynamic improvements to aircraft or surfaces having a flow interface and more particularly to embodiments and fabrication methods for use of both very stiff materials (such as nickel) and materials with a significant, but recoverable, elongation (such as high elongation elastomeric polymers and shape memory polymers and metals) to form aerodynamic riblets or other high-aspect-ratio surface microstructures requiring high durability.

2. Background

Increasing fuel efficiency in modern aircraft is being accomplished through improvement in aerodynamic performance and reduction of weight for both structural and non-structural components. Recent advances in the use of microstructures such as riblets on aerodynamic surfaces have shown significant promise in reducing drag to assist in reducing fuel usage. Riblets have various forms but advantageous embodiments may be ridge-like structures that minimize drag on the surface of an aircraft. Riblets may be used in areas of a surface of an aircraft exposed to a turbulent boundary layer. The riblet ridges tend to inhibit turbulent motions involving lateral velocities, thus reducing the intensity of small-scale streamwise vortices in the lower part of the boundary layer, and thus reducing skin-friction drag.

In certain tested applications riblets have been pyramidal or inverted V shaped ridges spaced on the aerodynamic surface to extend along the surface in the direction of fluid flow. Riblet structures have typically employed polymeric materials, non-elastomeric thermoplastic or thermoset polymers. However in service use such as on an aircraft aerodynamic surface, these polymer riblets are relatively easily damaged thus reducing the performance of the riblet and degrading the appearance of the surface. These surfaces were readily gouged by tools, edges of boots, maintenance equipment impacting or rubbing along the surface resulting in the need to replace or remove the riblets. This lack of durability has been the key impediment to the use of riblets for drag reduction. Non-elastomeric polymeric riblets may readily fracture or permanently deform hundreds of percent with tool- or fingernail-induced pressure. Thermoplastic polymers (fluoropolymers such as the ter-polymer tetrafluoroethylene hexafluoropropylene vinylidene fluoride (THV), fluorinated ethylene propylene (FEP) or polyethylene for example can undergo large deformations (hundreds of percent elongation) without breaking but those deformations will be largely unrecoverable destroying the both the appearance and the drag reduction benefits of the riblet structure. Thermosetting amorphous polymers (structural epoxies for example) deformed beyond their elastic limit cavitate and crack at low strains (typically at <10% elongation). Non-elastomeric polymers deform readily with a fingernail cross wise to the riblet ridges/grooves, either by plastic deformation or by cavitation and cracking. Such structures may be undesirable in normal service use on an aircraft or other vehicle.

The practicality of riblets for commercial aircraft use would therefore be significantly enhanced with a riblet structure providing increased durability.

SUMMARY

Exemplary embodiments provide an array of riblets with a surface layer for adhering to an aerodynamic surface and a plurality of riblet tips having a parabolic cross section extending from the surface layer. For the embodiments disclosed, the parabolic cross section of each tip has an equation of $y=px^2+h$ with respect to a y-axis substantially perpendicular to the surface layer wherein h is the height of the riblet from the surface layer and p is determined based largely on the material of fabrication of the riblet tips.

In certain instances, the surface layer and riblet tips are formed from a high elongation elastomer such as epoxy, urethane, perfluoroether or fluorosilicone and the embodiments may include an adhesive layer deposited on the surface layer opposite the tips, a cladding on the riblet tips such as a UV reflective coating or a polymer support layer deposited on the surface layer opposite the tips. In other instance, the riblet tips are formed from high modulus materials selected from the set of nickel, chromium, metal alloys, glasses, ceramics, silicon carbide or silicon nitride. The tips may also be constructed of multiple materials including multilayers of high modulus and polymers. A metallic layer or discontinuous metal layer and a polymer support layer intermediate the elastomeric layer and the adhesive layer may be included as an appliqué for lightning strike or other functional application.

The embodiments disclosed are fabricated in an exemplary method by selecting material for riblet array base and cladding and then determining a parabolic shape factor, p, for selected materials. Aerodynamic requirements for riblet height, h, and spacing are determined and a parabolic profile for riblets with equation $y=px^2+h$ is calculated. A master tool is formed having protuberances or depressions/indents with the parabolic profile corresponding to a desired riblet array and a complementary tool is formed from the master tool. In a further alternative method for web processing, the complimentary tool is a web tool.

The features, functions, and advantages that have been discussed can be achieved independently in various embodiments of the present invention or may be combined in yet other embodiments further details of which can be seen with reference to the following description and drawings

DETAILED DESCRIPTION

Figure 1:
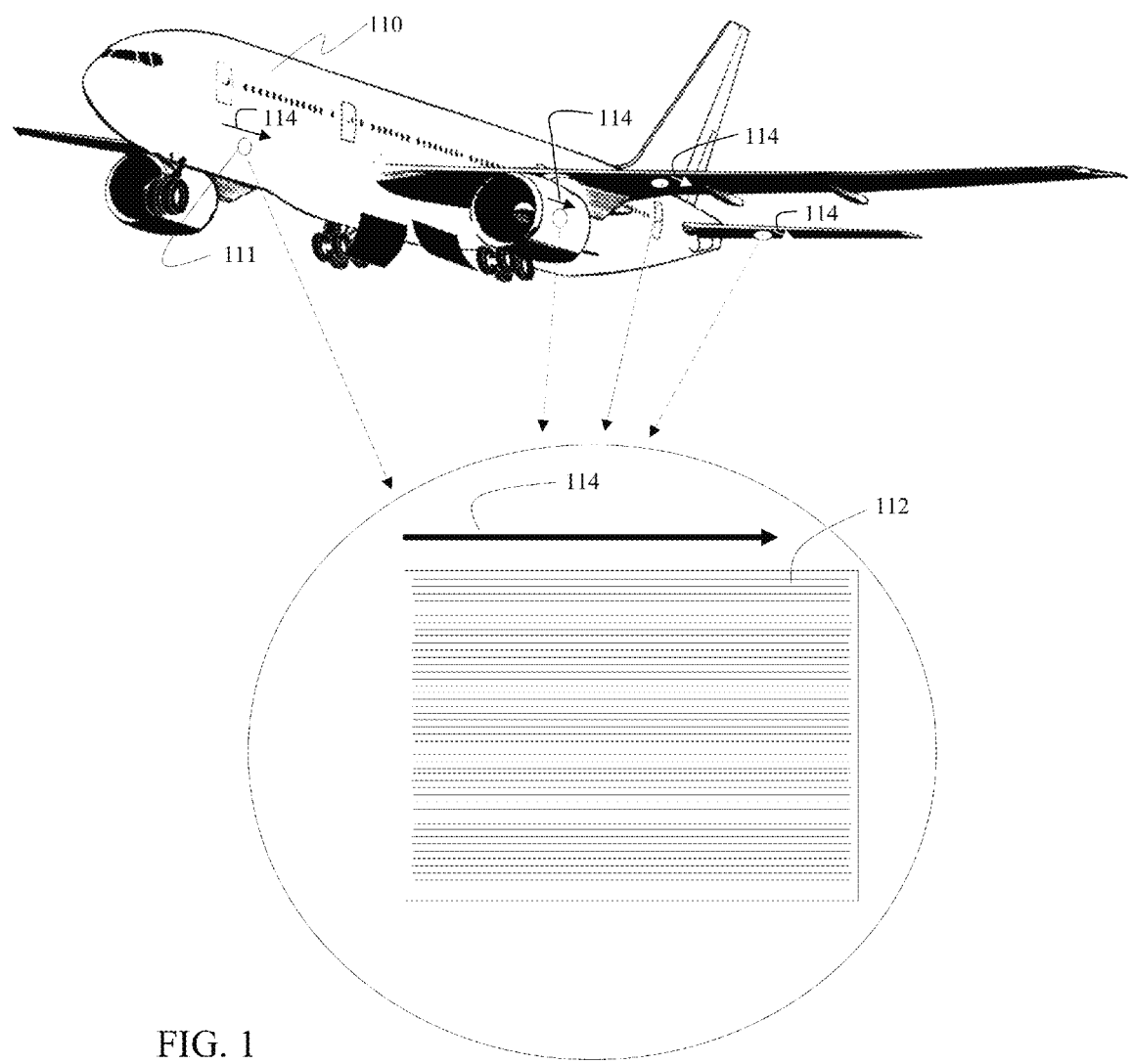
FIG. 1 is an isometric view of a portion of an aerodynamic surface such as a wing or fuselage skin showing exemplary riblets extending in the flow direction.

The embodiments disclosed herein provide riblets structurally designed for maximum durability by providing equalized stress along the riblet surface. The embodiments disclosed herein provide a parabolic section and are particularly applicable for high modulus materials and high elongation elastomeric materials for riblets that may be impacted by ground support equipment or environmental hazards such as hail to avoid permanent deformation/damage. These embodiments also allow an optimized structural design of riblets providing the capability for them to be thinner and more aerodynamically efficient. Materials having a small elastic region which would normally be plastically deformed in a non-recoverable manner may more readily be employed with the parabolic section defined herein. An exemplary embodiment of elastomeric riblets having a structure as will be described in greater detail subsequently is shown as a portion of an aerodynamic surface for an aircraft as shown in FIG. 1. The aircraft 110 employs a structure with a surface 111, shown enlarged, having multiple substantially parallel riblets 112 arranged parallel to the flow direction as represented by arrow 114. For the exemplary embodiment shown, the height dimension 116 perpendicular to the surface 111 is approximately 0.002 inch while the spacing 118 between the riblets is approximately 0.003 inch as shown for example in FIG. 9A. Spacing or distribution of the riblets in an array may vary depending on and be predetermined by the fluid dynamic properties of the air, water or other fluid for which the application of riblets is employed. The aerodynamic surface is typically, without limitation, curved and may be a portion of a wing, an engine nacelle, a control surface, a fuselage or other suitable surface. Therefore flexibility and conformability of the riblets and any structure supporting and affixing the riblets to the surface may be required. While described herein with respect to an aircraft aerodynamic surface the embodiments disclosed herein are equally applicable for drag reduction on surfaces of other aerospace vehicles such as, without limitation, missiles or rockets and other vehicles such as cars, trucks, buses and trains moving in a gaseous fluid, commonly air, or on boats, submarines, hydrofoils, fluid flow conduits or other surfaces exposed to liquid fluid flow. Additionally, these riblets may be used on rotating components such as helicopter rotor blades or windmills requiring high durability and improved aerodynamic performance.

The embodiments disclosed herein recognize and provide the capability for riblets that may resist various impacts and/or other forces that may reduce riblet durability. Further, certain of the different advantageous embodiments provide a multi-layer structure that may have a support layer and a plurality of riblet tips located on or extending from the support layer. In exemplary embodiments described in detail subsequently, the tips which form the riblets may be fabricated from high elongation elastomeric materials. The riblet tips themselves may be a multi-layer construction. The embodiments shown are also applicable for rigid tipped riblets or shape memory riblets for additional structural or high temperature capability.

Figure 2A:
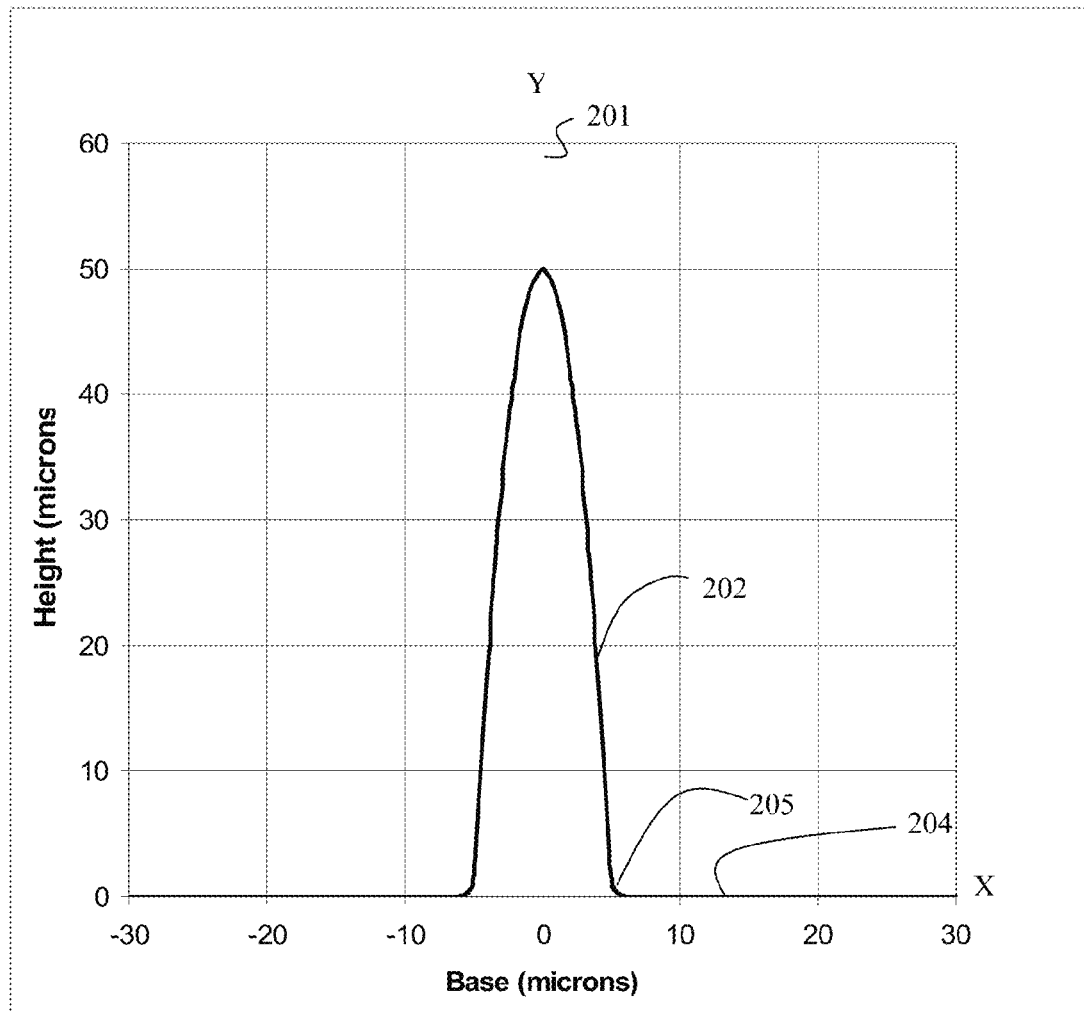
FIG. 2A is a detailed cross-section view of one riblet tip of the exemplary embodiment with a parabolic profile.

Exemplary shaping of the riblet profile for equalized stress over the height of the riblet to maximize the benefit of the chosen riblet material is shown in FIG. 2A, individual riblet tips 202 for the embodiments disclosed herein may incorporate a parabolic shape cross section having an equation $y = px^2 + h$ with respect to a y-axis 2034 where h is the riblet height 116 and the thickness of the riblet $t = 2x$ at an elevation of y. Determination of the actual shape parameter, p, may be dependent on the material selected for the riblets, the desired rigidity of the riblets and the required aerodynamic performance as will be described in greater detail subsequently. A preferred shape parameter $p = -h/x_b$, where $x_b$ is the half width of the base of the parabola, provides a narrow tip with a highly sloped surface near the tip for aerodynamic performance. For the exemplary embodiment $h = 50$ microns and $x_b = 5$ microns and therefore the shape parameter $p = -2$ provides broad applicability to numerous materials including rigid materials such as nickel and elastomers such as high elongation polyurethanes with a single design and master tooling. A base fillet 205 is defined at the interface between riblets 202 and surface layer 204 for distribution of load to avoid plastic failure or rupture of the surface layer at maximum deflection of the riblets. For the exemplary embodiment, 1 micron was chosen as the fillet radius to maximize the extent of the parabolic shape since it distributes the stress/strain uniformly; and because it is sufficient to eliminate the discontinuity with the planar surface preventing it from becoming the cause of riblet failure under the combined loads. The transition between the fillet and the parabola must be smooth and is done by making the fillet shape tangent to the parabola (and also to the planar surface). In various embodiments, the fillet can be circular, elliptical, parabolic or other smoothly varying shape tangent to the riblet and the planar surface.

Figure 2B:
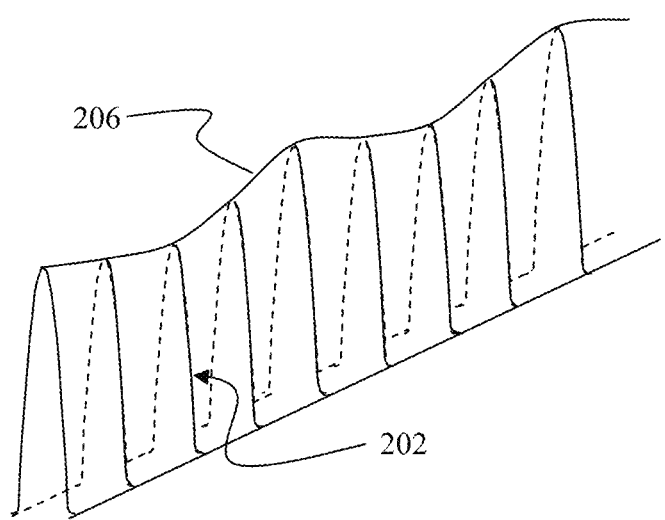
FIG. 2B is an exemplary embodiment with a varying parabolic structure in the streamwise direction.

Additional reduction in localized strain may be obtained by height oscillation along the ridge line 206 of the riblet tips 202 as shown in FIG. 2B. For the embodiment shown, an oscillation height of ±10% of the riblet height is employed.

Figure 3:
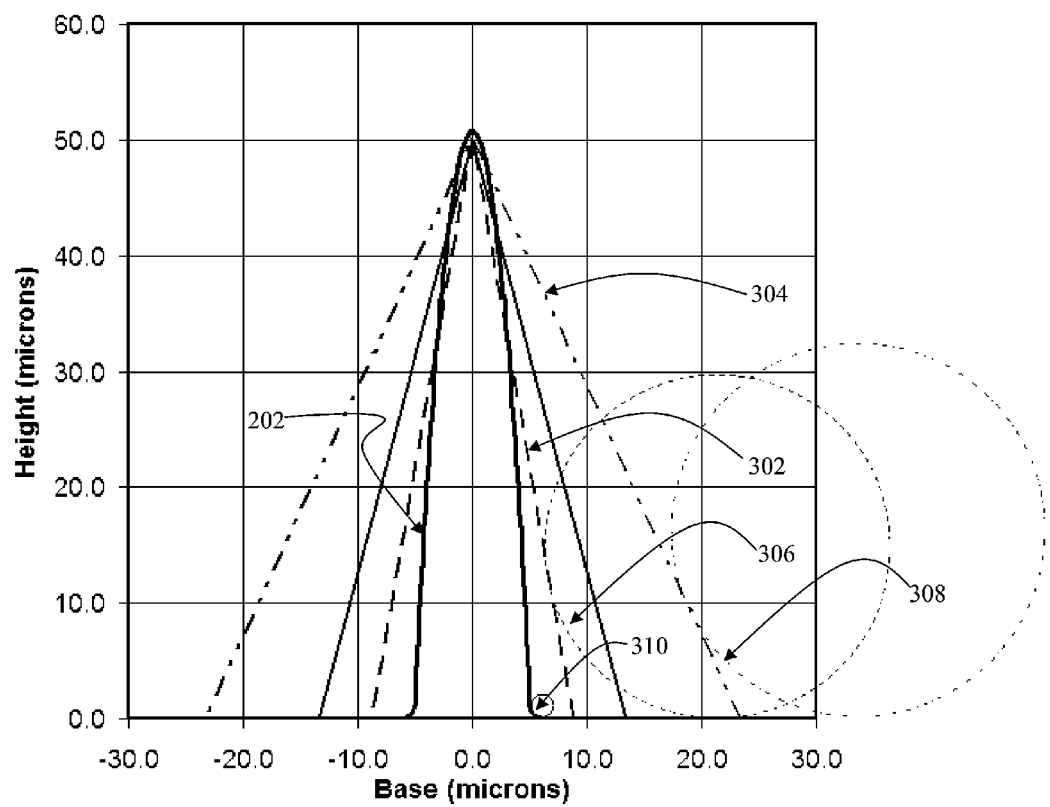
FIG. 3 is a comparative graph of the riblet tip design of the embodiment shown in FIG. 2 with prior triangular section designs.
Figure 4A:
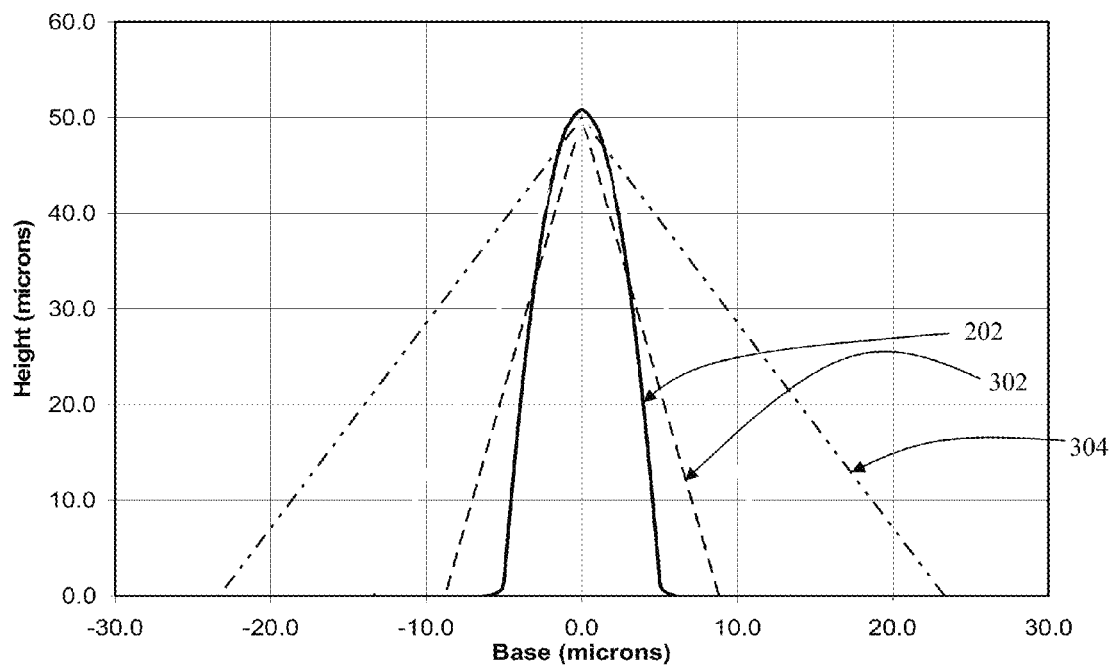
FIG. 4 is a detailed comparative graph of the riblet tip design of the embodiment shown in FIG. 2 with prior triangular section designs in an exaggerated y axis scale to demonstrate the relative area overlap.
Figure 4B:
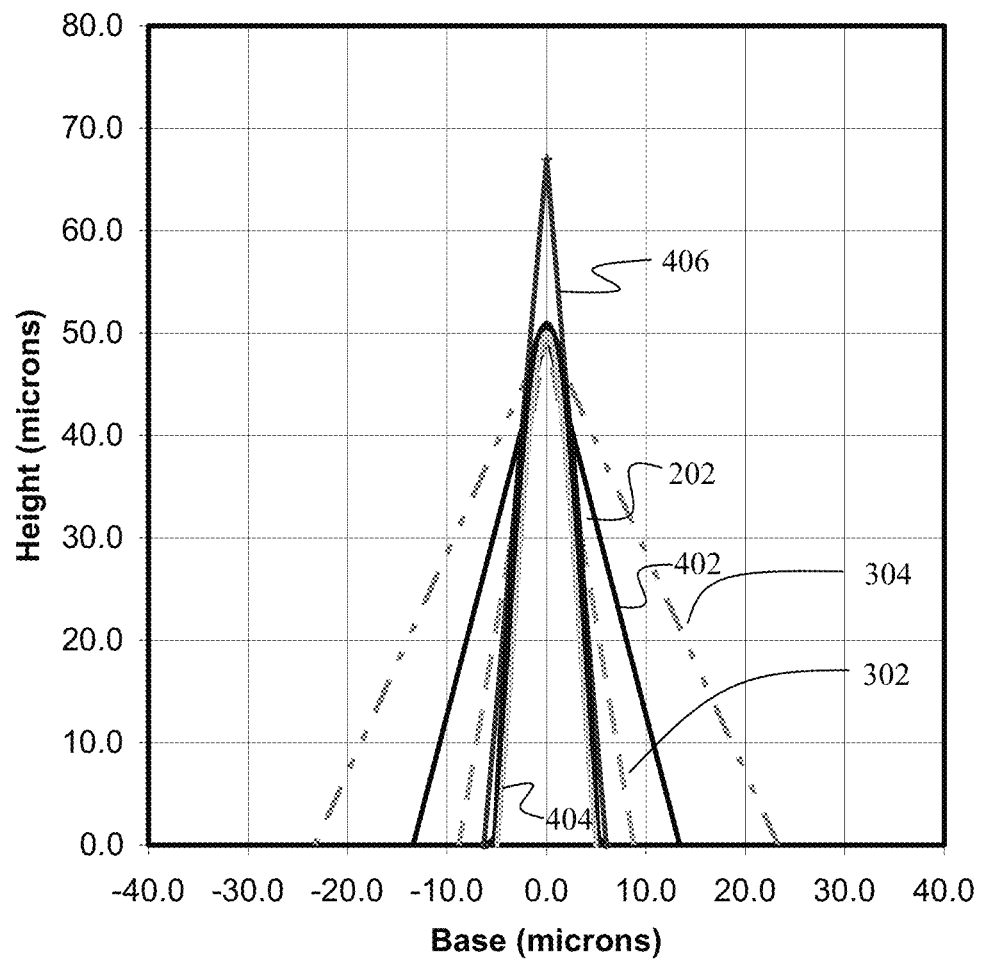

FIG. 3 shows the parabolic profile of the cross section of a riblet 202 of the current embodiment described above compared with exemplary prior art riblet shapes. Maximum and minimum triangular cross sections (50° and 20°) as disclosed by Bechert (U.S. Pat. No. 5,971,326) issued Oct. 26, 1999 to Bechert for a minimum profile 302 and maximum profile 304. The Bechert maximum radius fillet 306 for the minimum triangle and maximum radius fillet for the maximum triangle 308 are also shown for comparison. An exemplary fillet radius 310 for the present embodiment is also shown. The Bechert minimum profile, while desirable from an aerodynamic standpoint does not provide sufficient structural strength for high durability required of riblet surfaces. The Bechert maximum profile provides greater structural strength at the base, but not at the tip and provides significantly less aerodynamic drag reduction. The narrowest triangular design provides good drag reduction before implementation in service, but the tip is highly distortable resulting from stress and strain concentrations near the tip due specifically to the triangular geometry and the riblet spacing. The parabolic design of the current embodiment is narrower and maintains more highly sloped surfaces close to the top of the riblet ridge for improved aerodynamic performance compared to any of the 20°-50° triangular riblets while significantly improving structural capability by maintaining an equalized stress distribution over the cross sectional area. The riblet tip 202 is shown in detail in FIG. 4A with an expanded x axis for clarity in demonstrating the shape advantage (higher slopes close to the ridge) of the parabolic design with respect to the Bechert triangular profiles. As shown in FIG. 4B, the slopes for the Beckert 50° and 20° triangular riblets (302, 304), and an intermediate 30° triangular riblet 402 are 2.1, 5.7 and 3.7 respectively while the exemplary parabolic riblet slope may be considered to be between 10 and 13.4. by considering the slopes of a triangle 404 which is included within the parabolic profile and a triangle 406 in which the parabolic profile is included.

Figure 5:
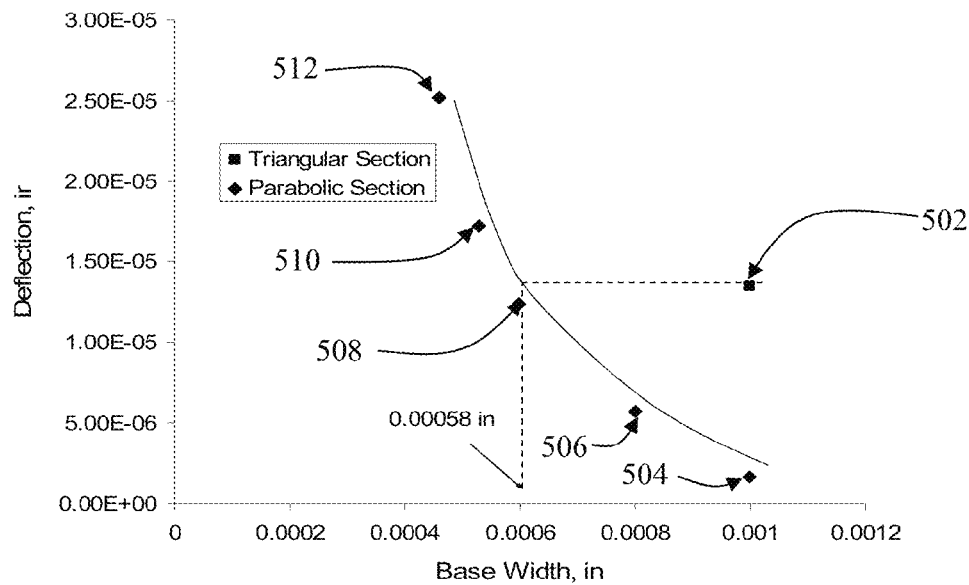
FIG. 5 is graph comparing tip deflection for the embodiment disclosed herein at various base widths.
Figure 6:
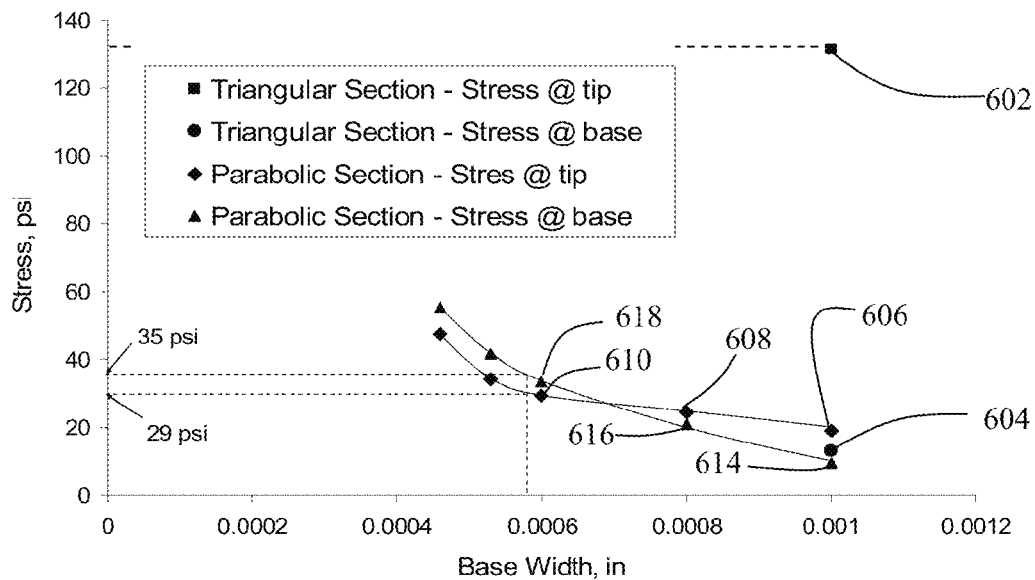
FIG. 6 is a graph comparing Von Mises stress at the tip and base of the embodiment disclosed herein at various base widths.

FIGS. 5 and 6 illustrate the large differences in structural behavior between the triangular riblet with a 30° included angle and a series of parabolic riblet designs. A 30-degree triangular riblet with a base of 0.001 inch, data point 502, was chosen for comparison since there was laboratory or flight data showing durability issues for this geometry with both nickel and polymer composition. In both plots a 1 psi load is applied to the tip of parabolic and triangular riblets. The data points for a parabolic design 502, 504, 506, 508, 510 and 512 in FIG. 5 demonstrate that a parabolic design with a 0.00058 inch base has an equivalent tip deflection to a 30° triangular riblet with a base of 0.001 inch data point 502 illustrating the potential weight savings and aerodynamic benefits of the parabolic design that derive from the highly sloping walls near the tip.

Similarly, as shown in FIG. 6, comparisons of Von Mises stress under a 1 psi load applied to the tips for the 30° triangular and various parabolic riblets illustrating the large stress reduction obtained specifically with a parabolic riblet. The figure also demonstrates that widely disparate stresses exist at the tip base 602 and tip end 604 of the 30° triangular section riblet; approximately 16 psi at the tip base and 130 psi at the pointed tip of the triangle while for the varying base widths from 0.001 to 0.0004 of the parabolic section have substantially constant stress of about 29 psi at the tip ends 606, 608 and 610 between base widths of 0.001 and 0.00058 while the stress is less than 35 psi at the tip bases 614, 616 and 618 for those base widths and only increases marginally for base widths down to 0.0004 inch. The dashed lines show tip and base stress of the parabolic riblet with a base width where the riblet tip has deflected equivalently to the triangular riblet.

Figure 7A:
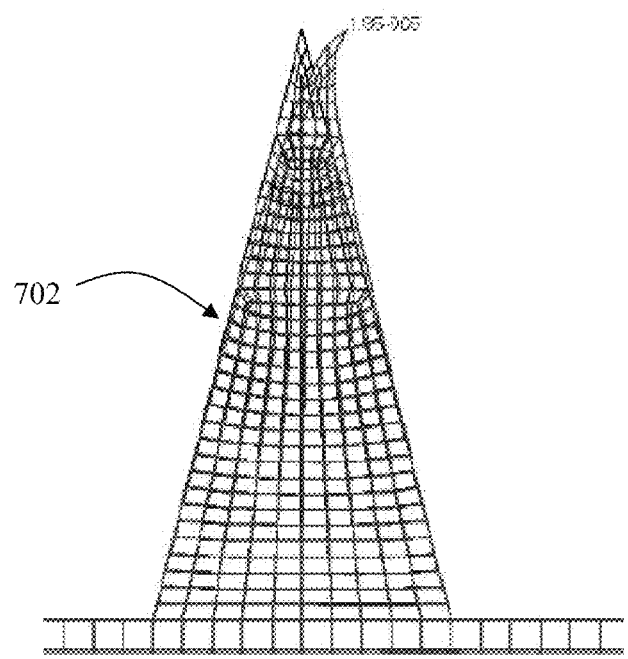
FIG. 7A is a section mesh demonstrating exaggerated tip deflection of a triangular cross section for an exemplary riblet tip.
Figure 7B:
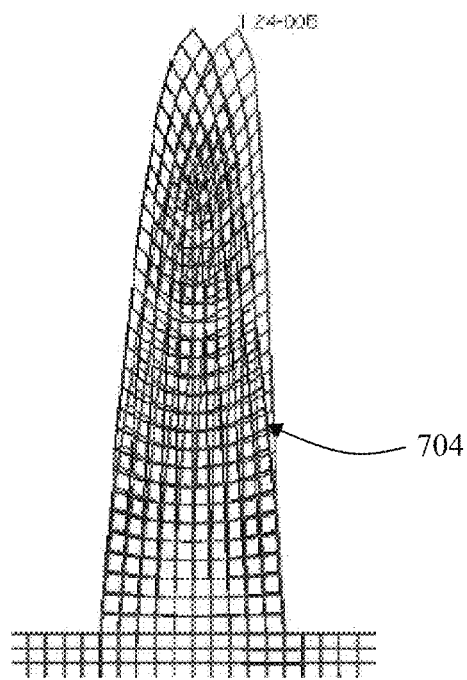
FIG. 7B is a section mesh demonstrating exaggerated tip deflection of a parabolic cross section riblet tip of the present embodiment.

This disparity in stress levels within the cross section of the riblets has a dramatic effect on the deflection profile through the structure of the riblet as shown in FIGS. 7A and 7B for a triangular riblet 702 and parabolic riblet 704 respectively with an enhancement scale factor of 0.05 to exaggerate the deflection for clarity. Deflections which might exceed elastic limits near the tip end in a triangular profile riblet tip are distributed through the section in a parabolic riblet tip thereby avoiding non-recoverable plastic deformations. An embodiment employing a nickel riblet tip is used for the analysis shown in FIGS. 7A and 7B.

Figure 8A:
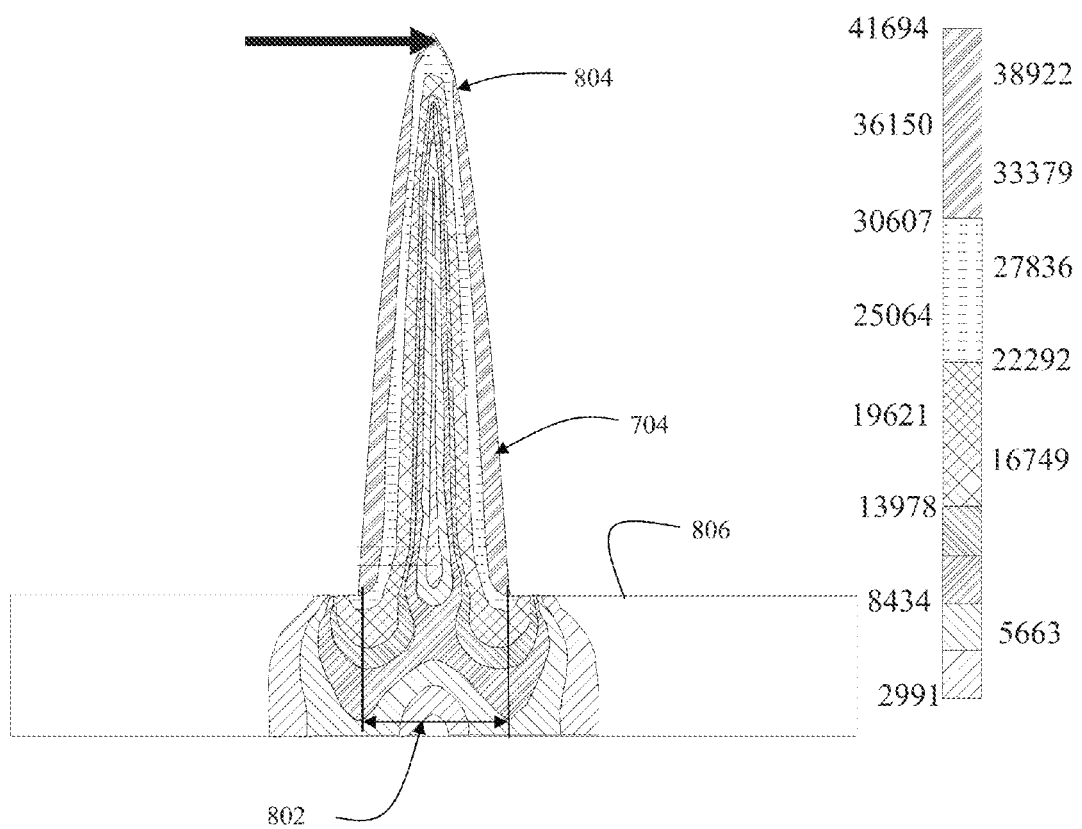
FIG. 8A is a section stress plot of Von Mises stresses in a riblet tip of the present embodiment.
Figure 8B:
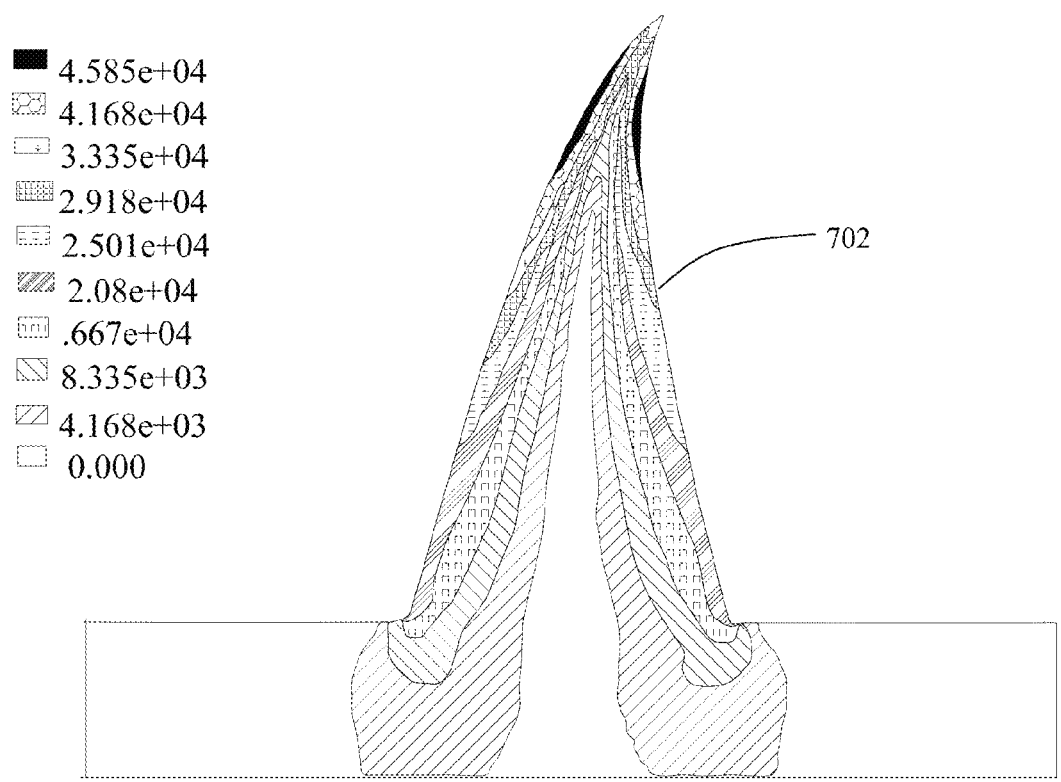
FIG. 8B is a section stress plot of Von Mises Stresses in a riblet tip having a triangular cross section as a comparative example for the present embodiment as shown in FIGS. 8A and 8B.

A graphic visualization of the Von Mises stresses in the exemplary nickel parabolic riblet tip 704 having a base width 802 of 0.00058 inch and a height of 0.002 inch is shown in FIG. 8A. An embodiment employing a nickel riblet tip is also used for the analysis shown in FIG. 8A. For simplification the exemplary model does not have a fillet at the base and therefore a stress concentration is present just above the base due to this discontinuity. A fillet as disclosed in various embodiments herein is employed to distribute the load in this area, thereby eliminating structural failure at this location. The parabolic profile of riblet tip 704 allows the stresses to be distributed uniformly along the height of the entire riblet as opposed to concentrating near the tip. Note that the high stresses represented in the drawing in the parabolic tip of FIG. 8A are due to the lack of geometrical fidelity in the model. In contrast, the image of the 30° triangular riblet 702 in FIG. 8B shows highly localized deformation and stress that may result in unrecoverable deformation or cracking in the tip end area. As will be described subsequently, riblet tip structures may employ a cladding over a rigid or elastomeric core. The equalization of stress along the surface over the entire riblet length provided by the parabolic profile as demonstrated in FIG. 8A may preclude localized cracking of the cladding by providing equalized stress in the surface layer. Alternatively for a more frangible design such as the 30° triangle with anticipated cracking of the cladding, equalized stress levels may provide consistent cracking spaced along the surface of the tip.

Figure 8C:
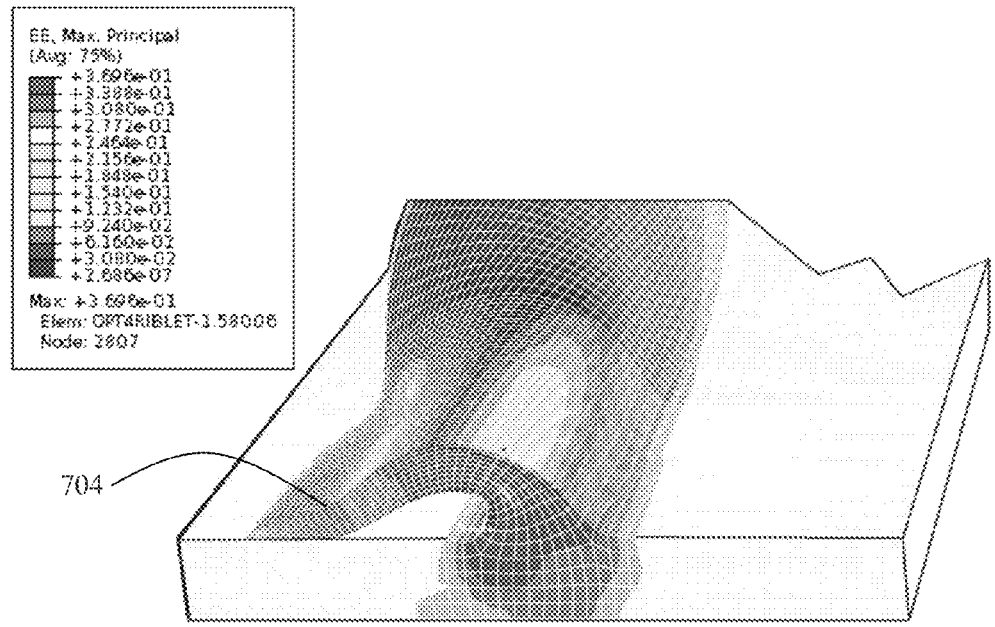
FIG. 8C is a stress plot of an exemplary parabolic cross section riblet tip formed from a high elongation elastomer and bent into contact with the surface layer.
Figure 8D:
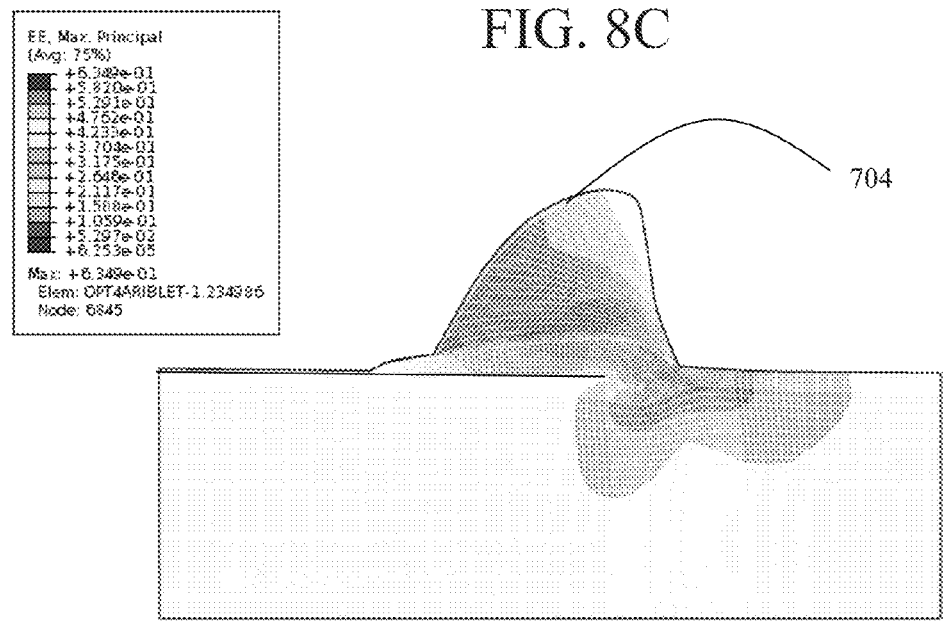
FIG. 8D is section stress plot of a round fillet riblet with maximum principal strain distribution.
Figure 8E:
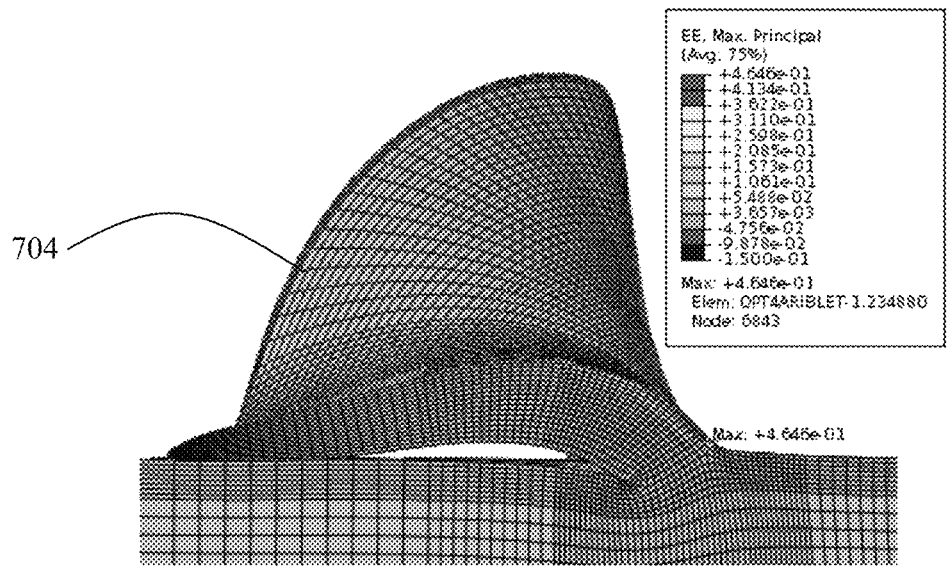
FIG. 8E is a section stress plot of round fillet riblet with maximum principal strain.
Figure 8F:
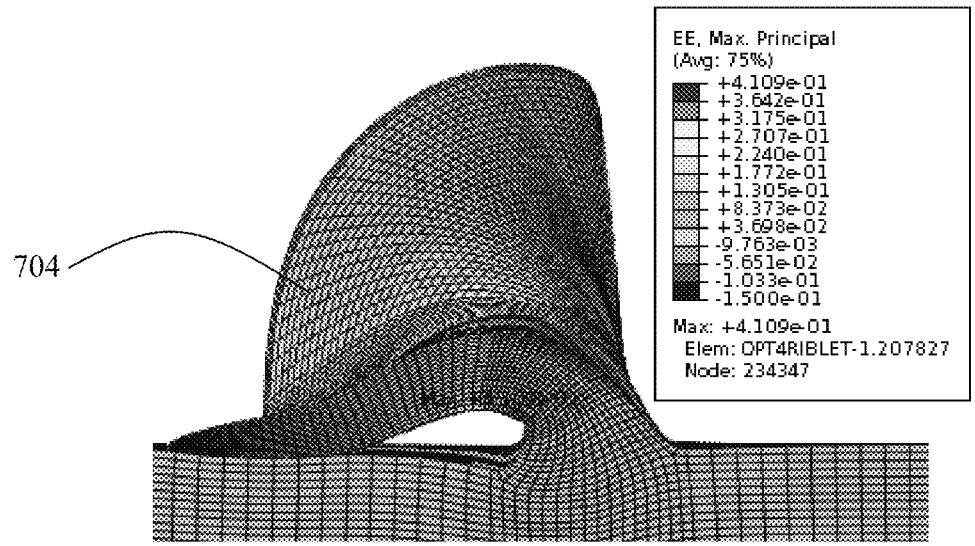
FIG. 8F is a section stress plot of an elliptical fillet riblet with maximum principal strain for comparison to FIG. 8E.

The parabolic shaping provides significant benefit because it uniformly distributes the stress and strain along the entire riblet. The higher the recoverable elongation in the material the better because the riblet tips are very narrow, especially in the case of the triangular shape where the tips may be 0.1 micron. A fingernail gouge for an elastomer that is 0.1 micron thick at the tip of a triangular riblet can be stretched across more than one and maybe multiple riblets which are spaced approximately 90 microns apart which is greater than 900% if only the tip is participating. For the exemplary embodiments, the parabolic riblet folded flat to the planar surface has a maximum strain along the outside edge of only 37% as shown in FIG. 8C. FIG. 8D shows the maximum principal strain distribution for the exemplary riblet shape. FIGS. 8E and 8F show a comparison of an ellipse shaped fillet and a round fillet respectively at maximum principal strain.

Figure 9A:
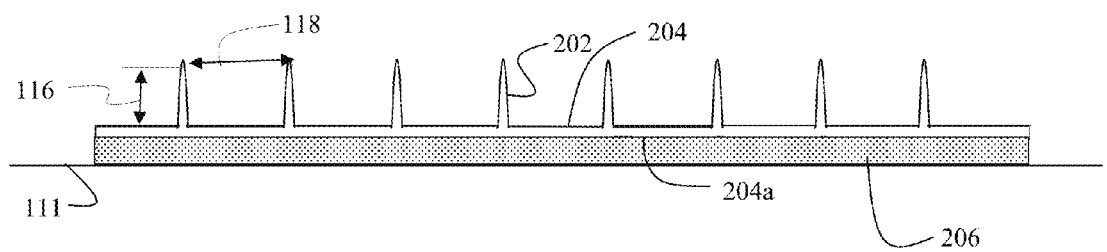
FIG. 9A is a lateral section view looking into the flow direction of a first embodiment which may employ structurally designed aerodynamic riblets.

An embodiment for exemplary riblets employing high elongation elastomeric, rigid tipped riblets or shape memory alloys is shown in FIG. 9A as a multilayer construction. Individual tips 202 of the riblets, having a parabolic section as previously described, protrude from surface layer 204. The protruding riblets and continuous surface layer are formed by casting or deposition of high modulus materials such as nickel, chromium, other metal alloys, glass, ceramics, Silicon Carbide or Silicon Nitride, amorphous metal alloys such as Vitreloey 105 (Zr: 52.5 Ti: 5 Cu: 17.9 Ni: 14.6 Al: 10) or Vitreloy 106a (Zr: 58.5 Cu: 15.6 Ni: 12.8 Al: 10.3 Nb: 2.8), shape memory alloys (SMAs), such as copper-zinc-aluminum-nickel, copper-aluminum-nickel, nickel-titanium (NiTi), pseudo-elastic beta titanium alloys and other suitable metal alloys, providing superelastic behavior arising from the reversible stress-induced martensitic phase transformation, shape memory elastomer such as, for example without limitation, polyhedral oligosilsesquioxane (POSS)-modified polyurethane or more typical elastomers including polyurethanes, silicones, epoxy, polysulfide, ethylene propylenediene, fluorosilicone, and fluoroelastomers, with a rigid metal coating such as nickel or alternative rigid materials such as chromium, other metal alloys, glass, ceramics, silicon carbide or silicon nitride, or as an exemplary embodiment, a high elongation elastomer such as a urethane similar PRC PR 1664D. In various embodiments the high elongation elastomer may be selected from the set of polymers and copolymers (typically block copolymers) and shape memory polymers of epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, and other hybrid polymers that include polyhedral oligomeric silsesquioxane (POSS). The elastomeric polymer may be filled or unfilled. For the embodiment shown in FIG. 9A an adhesive layer 206 is deposited on a bottom 204a of the surface layer 204. This adhesive could be one of many possibilities including, without limitation, pressure sensitive acrylic adhesives, polyurethane pressure sensitive adhesives, polysulfide, epoxy, thermoplastics, thermally-reactive adhesives, silicone adhesives, or fluorosilicone adhesives.

Figure 9B:
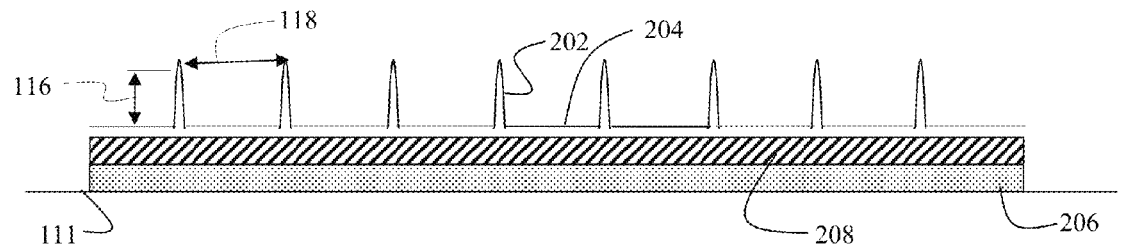
FIG. 9B is a lateral section view of a modification of the embodiment of FIG. 2A with an additional support layer.

In alternative embodiments, a supporting polymer layer 208 engages the surface layer 204 intermediate the surface layer 204 and adhesive layer 206 as shown in FIG. 9B. The supporting polymer layer 208 may be a polymer film or other suitable material. In certain embodiments polyetheretherketone (PEEK) is employed. The supporting polymer, adhesive and/or other elements in the second layer provide additional stiffness or resilience and the ability to adhere to the surface and may be prepared as a prefabricated appliqué on which the high elongation elastomer of the surface layer and tips is deposited or formed.

Figure 9C:
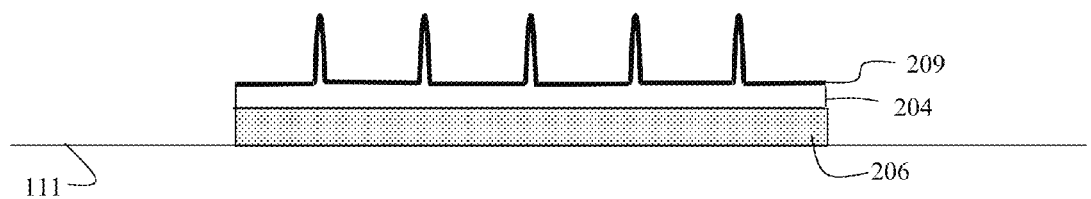
FIG. 9C is a lateral section view of a modification of the embodiment of FIG. 2A with cladding over the based material of the riblet

FIG. 9C is an additional alternative embodiment wherein the high elongation elastomer is coated with a surface cladding 209. For the exemplary embodiment shown, cladding 209 is a transparent but ultra-violet (UV) reflective or absorptive coating such as zinc oxide or indium tin oxide. The elastomeric surface layer 204 may then be adhered to a surface using an adhesive layer 206 or directly as described with respect to FIG. 2D. The cladding may also provide alternative functionality such as electrical conductivity/resistivity to dissipate or conduct p-static charges (<500 Ohm/square), shape memory or provide coloration or other decorative effects. In various alternative embodiments to achieve the desired functionality, the cladding is selected from either organic and inorganic moieties or hybrids. Exemplary claddings for various embodiments may be selected from either organic and inorganic moieties or hybrids. Organic cladding is selected from the set of thin films of parylene, PTFE, polyamide (Nylon), polyimide and polyethylene. Inorganic cladding may be thin films or multilayer films including amorphous diamond like coatings (DLC), metals such as aluminum, chromium, gold, platinum, rhodium or nickel, and oxides such as silicon dioxide, aluminum oxide, indium tin oxide, tin oxide, titanium oxide, zinc oxide, and nitrides such as boron nitride and silicon nitride. Hybrid cladding may be organic-inorganic sol gels or pendant POSS or organo-metallic monolayers, or nanolayers such as metal-polymer produced by Modumetal 1443 N. Northlake Way, Seattle, Wash. 98103, or ceramic-metal or ceramic-polymer nanolayer.

It is anticipated that the protective cladding 209 may not have elongation properties similar to the high elongation elastomer tips 202 and surface deflection of the high elongation elastomer is expected and upon elimination of the load and recovery of the elastomer to near original shape, UV protection by the cladding, which remains adhered to the elastomeric tips and surface layer even though cracked, will be substantially maintained. The cladding 209 may provide resistance to electromagnetic effects such as static charging which a composite structure alone may not provide thereby substituting for or supplementing LSA foil appliqués and similar materials. The cladding 209 may also be multilayer or interference film which may provide enhanced UV protection, color and decorative effects. The cladding may also be a nanometer scale array of particles or rods or other structure that lies at or near the surface of the parabola. Such nano structures may be formed from zinc oxide or titanium oxide for example.

In the form shown in FIG. 9A, 9B or 9C, the embodiment may be fabricated as a multilayer appliqué 207 as shown in FIG. 9B, including tips 202, surface layer 204, supporting polymer layer 208 and adhesive layer 206 which can then be adhered to the aerodynamic surface using the adhesive layer 206. Alternative embodiments for may also employ a metal mesh/inductive grid, capacitive grid, or foil such as aluminum. The foil, polymer and adhesive multilayer structure may be comparable to a current Lightning Strike Appliqué (LSA) employed for composite aircraft structural surfaces such as that disclosed in U.S. patent application Ser. No. 11/611,023 to Rawlings filed on Dec. 14, 2006 entitled LIGHTNING STRIKE PROTECTION METHOD AND APPARATUS. The metal layer in alternative embodiments may be discontinuous and may provide a structure of a Wide Area Lightning Diverter Overlay (WALDO) Ser. No. 11/229,911 to Rawlings et al. filed on Sep. 19, 2005 entitled WIDE AREA LIGHTNING DIVERTER OVERLAY or integrated electronic circuits within the multilayer structure as disclosed in companion application Ser. No. 112/612576 to Rawlings filed on Dec. 19, 2006 entitled LARGE AREA CIRCUITRY USING APPLIQUES, the disclosures of which are incorporated herein by reference.

In alternative embodiments, the surface layer 204 may be directly adhered to or deposited on the aircraft surface 111. In such alternative embodiments, supporting polymer layer 208 may employ a thermoplastic (or thermosetting resin such as an epoxy) in a configuration similar to that disclosed in FIG.

9B without an adhesive layer which allows direct bonding to the aircraft surface 111 with application of heat, radiation or through magnetic inductance.

Figure 9D:
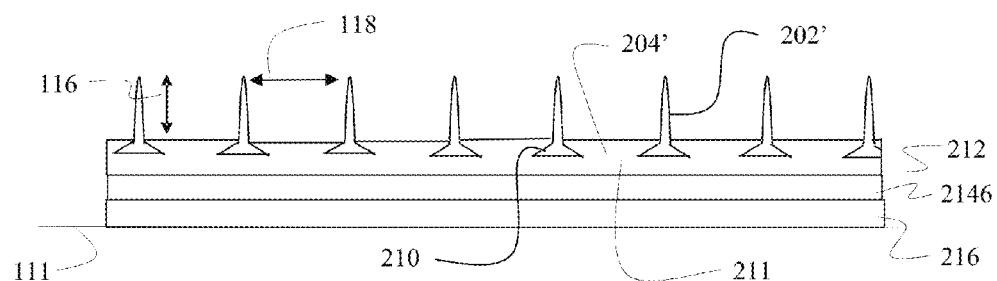
FIG. 9D is a lateral section view of a an alternative embodiment with rigid riblet tips.

For the embodiment shown in FIG. 9D, rigid tipped riblets fabricated from high modulus metals such as nickel (used for the embodiment described herein) or alternative rigid materials such as chromium, other metal alloys, glass, ceramics, silicon carbide or silicon nitride are shown. With complex or multiple curved surfaces, it may be desirable for the individual riblet tips 202' be separated from each other perpendicular to the flow direction for greater lateral flexibility. For the embodiment shown individual tips 202' protrude from an elastomeric layer 204'. Tips 202' have a parabolic profile as described with respect to FIG. 2. A base 210 expands from each tip. In certain embodiments the elastomeric layer 204' surrounds the base 210 to provide greater structural continuity. In alternative embodiments a bottom face 211 of the base adheres directly to the exposed surface 204a of the elastomeric layer 204'.

A multilayer structure incorporating a screen and/or foil metallic layer 212 such as aluminum, a polymer layer 214 such as PEEK and an adhesive layer 216 supports the elastomeric layer 204'. The polymer layer 214 and adhesive layer 216 may be supplied as a portion of the preformed appliqué or directly deposited on the elastomeric layer 204'. The metallic layer 212 provides a conducting material for lightning strike protection in an exemplary aircraft usage of the embodiment. The metallic layer, polymer and adhesive multilayer structure may be comparable to a current lightning strike appliqué (LSA) employed for composite aircraft structural surfaces.

The elastomer layer 204' supporting the riblet tips 202' may provide elastic sideways deformation and recovery for the tips when lateral forces are applied thereby further enhancing the durability of the rigid riblet tips. Additionally, the elastomeric layer flexibility may allow greater ability to conform to complex contour shapes.

Figure 10A:
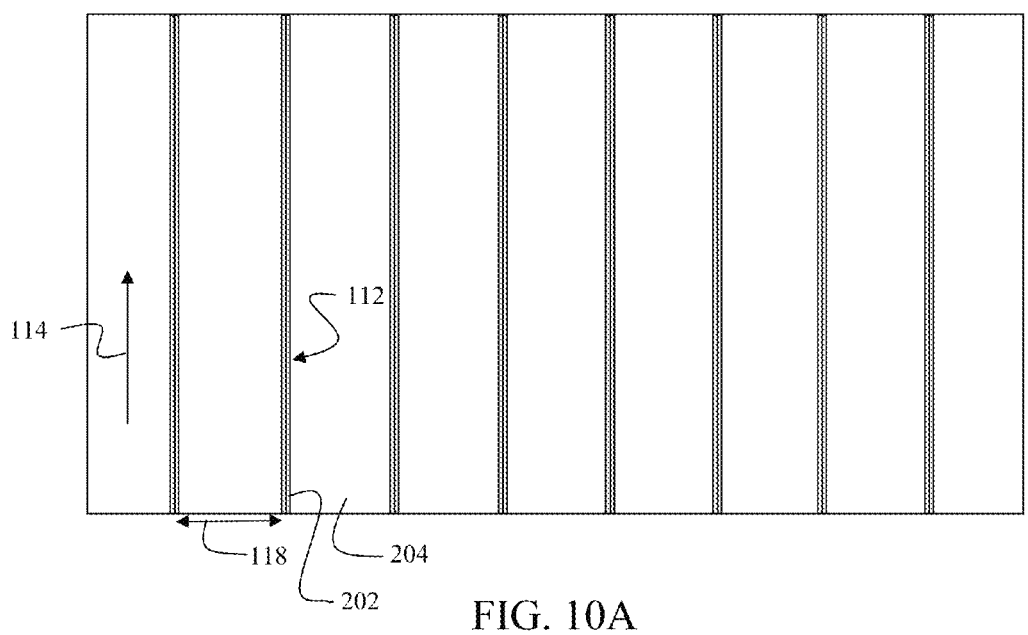
FIG. 10A is a top view of a portion of an aerodynamic surface employing riblets of the embodiment as shown in FIG. 9B.
Figure 10B:
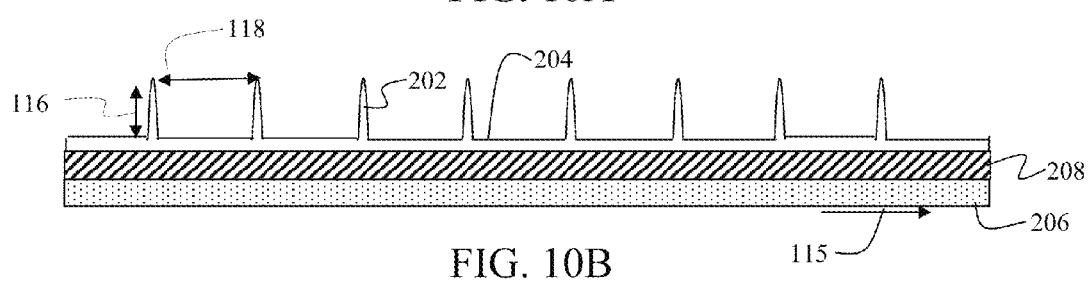
FIG. 10B is a section view comparable to FIG. 9B for reference with the features of FIG. 10A.

FIGS. 10A and 10B show top and side views of the embodiment as disclosed in FIG. 9B as an example of the riblet arrays resulting from the disclosed embodiments. The riblets 112 formed by the tips 202 expand longitudinally along surface layer 204 in the flow direction 114. The thin surface layer 204 provides for flexibility in adhering to curvature having tangents substantially perpendicular to the riblets 112 as represented by arrow 115. The properties of the high elongation elastomer used in the embodiments described allows flexibility in deformation of the appliqués to match surface contours of the aircraft or other surface on which the riblet arrays are applied.

Figure 11:
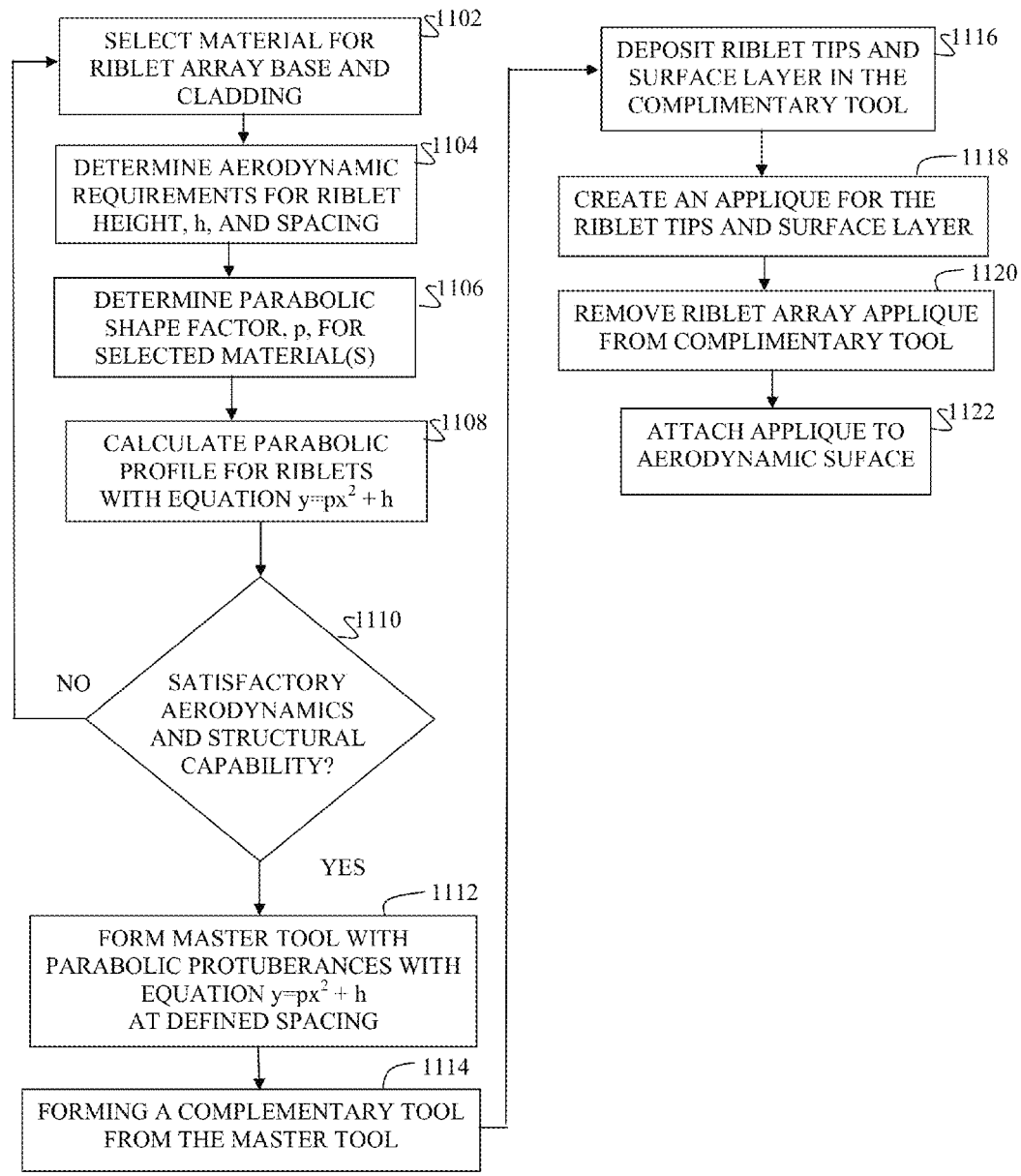
FIG. 11 is a flow chart of a shaping method for riblet tips of the present embodiment.

As shown in FIG. 11, for embodiments as described, selection of a material desired for high riblet durability such as high elongation elastomers, rigid riblets or shape memory alloys is made, step 1102. A determination of height, h, and spacing, d, for the aerodynamic performance of the riblet array is made, step 1104, and the determination of the profile factor, p, for the parabolic profile is made for the selected material, step 1106. The parabolic profile for the riblets is then calculated, step 1108 and a determination of resulting aerodynamic and structural performance is made 1110. Iteration of the material, profile factor, height and spacing may be accomplished to optimize the resulting riblet array. Additionally, for high elongation elastomeric riblet tips or other materials in which a cladding is desirable, determination of the parabolic profile factor may include selecting the profile factor consistent with a cladding on the selected riblet material. A UV resistant material such as zinc oxide or indium tin oxide would be exemplary for high elongation elastomer riblets.

A master tool is then formed having parabolic protuberances corresponding to the desired riblet array shape and substantially flat intermediate surfaces for the spacing, step 1112. A complementary tool is formed from the master tool, step 1114, which may be accomplished by impression on the master tool to provide grooves corresponding to a riblet shape with spacing between the grooves providing the substantially flat intermediate surface. While shown as a single set of master tool and complimentary tool for the method shown alternative embodiments may employ multiple master and complimentary tool sets for web processing or alternative processes. Riblet tips and a surface layer are deposited on the complimentary tool, step 1116. In various embodiments of the method, the tips and surface layer may be of high elongation elastomeric materials or rigid or shape memory alloy tips embedded in an elastomeric surface layer. High elongation elastomeric materials may be selected from the set of urethane, epoxy and fluorosilicon as described for the embodiments herein. Elastomeric materials may be cast onto the complimentary tool or for web tool applications, sprayed or dip formed onto the tool. Forming of rigid or shape memory alloy tips may be accomplished by such methods as sputtering a metal cladding on the complimentary tool and electroforming the tips onto the cladding.

An appliqué is then created for the riblet tips and surface layer, step 1118. In various embodiments, the appliqué may be an adhesive layer deposited on the surface layer opposite the riblet tips. An adhesive liner may be added for convenience in handling of the appliqué and then removed prior to application to a surface. Alternative embodiments include a supporting polymer layer intermediate the surface layer and adhesive layer and, optionally, a metal foil or mesh layer for creation of a lightening protection appliqué. The appliqué is then removed from the complementary tool, step 1120, and adhered to an aerodynamic surface, step 1122. In certain alternative embodiments the complementary tool may act as a protective masking which is retained until the appliqué is adhered to the surface. In other embodiments, a masking layer may be added for handling protection of the riblets and then removed after the appliqué is adhered to the surface.

For embodiments employing a high elongation elastomeric for the riblet tips and surface layer, the UV resistant cladding previously described may be deposited over the high elongation elastomeric layer after removal from the complimentary tool or where the complimentary tool is a web tool the UV resistant coating may be sputtered onto the web tool prior to depositing the high elongation elastomeric layer.

Figure 12A:
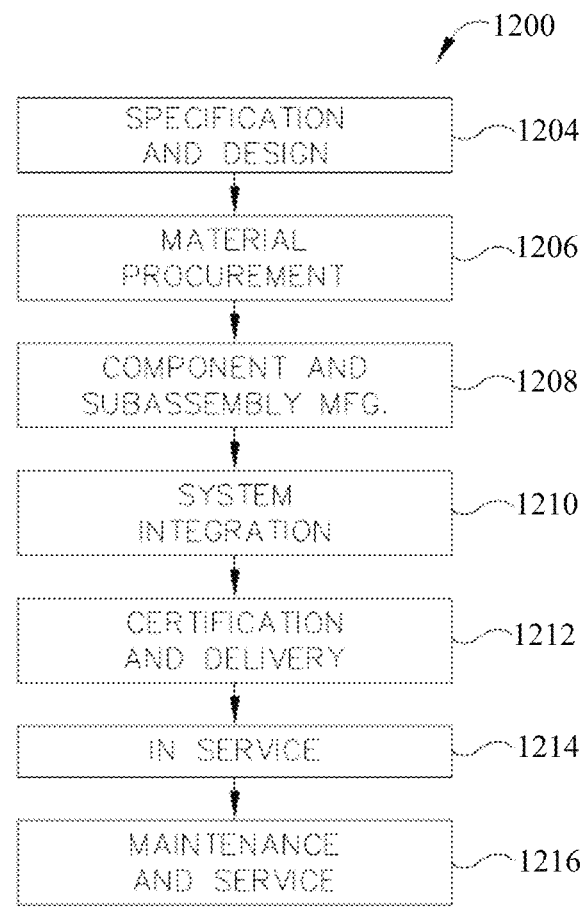
FIG. 12A is a flow diagram describing use of the rigid tipped riblets embodiments disclosed herein in the context of an aircraft manufacturing and service method.
Figure 12B:
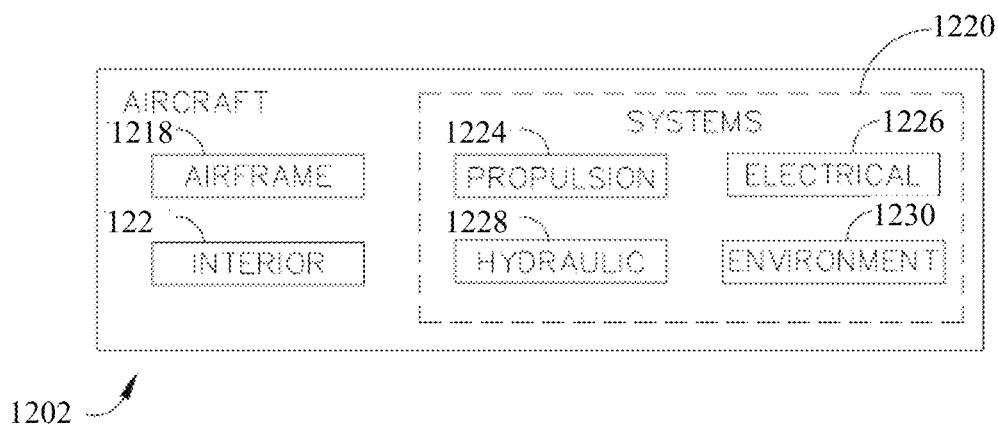
FIG. 12B is a block diagram representing an aircraft employing the rigid tipped riblets with embodiments as disclosed herein.

Referring more particularly to FIGS. 12A and 12B, embodiments of the high elongation elastomeric riblets disclosed herein and the methods for their fabrication may be described in the context of an aircraft manufacturing and service method 1200 as shown in FIG. 12A and an aircraft 1202 as shown in FIG. 12B. During pre-production, exemplary method 1200 may include specification and design 1204 of the aircraft and material procurement 1206. During production, component and subassembly manufacturing 1208 and system integration 1210 of the aircraft takes place. The riblet appliqués and their manufacturing processes as described herein may be accomplished as a portion of the production, component and subassembly manufacturing step 1208 and/or as a portion of the system integration 1210. Thereafter, the aircraft may go through certification and delivery 1212 in order to be placed in service 1214. While in service by a customer, the aircraft 1202 is scheduled for routine maintenance and service 1216 (which may also include modification, reconfiguration, refurbishment, and so on). The riblet appliqués as described herein may also be fabricated and applied as a portion of routine maintenance and service 1216.

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12B, the aircraft 1202 produced by exemplary method 1200 may include an airframe 1218 having a surface 111 as described with respect to FIG. 1 and a plurality of systems 1220 and an interior 1222. Examples of high-level systems 1220 include one or more of a propulsion systems 1224, an electrical and avionics system 1226, a hydraulic system 1228, and an environmental system 1230. Any number of other systems may be included. The high elongation elastomeric riblets supported by the embodiments disclosed herein may be a portion of the airframe 1218, notably the finishing of skin and exterior surfaces. Although an aerospace example is shown, the principles disclosed in the embodiments herein may be applied to other industries, such as the automotive industry and the marine/ship industry.

Apparatus and methods embodied herein may be employed during any one or more of the stages of the production and service method 1200. For example, components or subassemblies corresponding to production process 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:
1. An array of riblets comprising:
an aerodynamic surface;
a surface layer for adhering to the aerodynamic surface;
a plurality of riblet tips of less than 0.002 inches in height and less than 0.001 inch in base width extending from the surface layer with each riblet tip exposed and subject to deformation, said riblet tips each having a parabolic cross section to provide equalized stress along the riblet surface wherein the parabolic cross section of each riblet tip has a shape with an equation of $y=px^2+h$ with respect to an x-axis parallel to the surface and a y-axis perpendicular to the surface layer wherein h is the height of the riblet tip from the surface layer and p is determined based on the material of fabrication of the riblet tips and the loads imparted to the surface by maintenance and environmental factors.

2. The array of riblets as defined in claim 1 further comprising an adhesive layer deposited on the surface layer opposite the riblet tips.

3. The array of riblets as defined in claim 1 further comprising a cladding on the riblet tips.

4. The array of riblets as defined in claim 1 further comprising a polymer support layer deposited on the surface layer opposite the tips.

5. The array of riblets as defined in claim 4 further comprising an adhesive layer deposited on the polymer support layer to form a multilayer appliqué, said adhesive layer adhering the appliqué to a vehicle surface.

6. The array of riblets as defined in claim 1 wherein the riblet tips and the surface layer comprise a high elongation elastomer and further comprising a UV resistant cladding on the high elongation elastomer.

7. The array of riblets as defined in claim 1 wherein the riblet tips are formed from material selected from the set of nickel, chromium, metal alloys, glass, ceramics, silicon carbide or silicon nitride.

8. The array of riblets as defined in claim 7 further comprising a metallic layer and a polymer support layer intermediate the elastomeric layer and the adhesive layer.

9. The array of riblets as defined in claim 1 wherein the surface layer and riblet tips are formed from a high elongation elastomer elastically recoverable for elongation of 300-3000%.

10. The array of riblets as defined in claim 9 wherein the high elongation elastomer is selected from the set of polymers and copolymers and shape memory polymers of epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, and hybrid polymers including polyhedral oligomeric silsesquioxane (POSS).

\* \* \* \* \*